(12) United States Patent
Endo et al.

(10) Patent No.: US 6,343,482 B1
(45) Date of Patent: Feb. 5, 2002

(54) HEAT PUMP TYPE CONDITIONER AND EXTERIOR UNIT

(76) Inventors: Takeshi Endo; Shinichiro Yamada; Kazuhiro Tsuchihashi, all of c/o Shimizu Works, Hitachi Air Conditioning Systems Co., Ltd., 23-2, Kandasudacho 1-chome, Chiyoda-ku, Tokyo 101-0041; Noriyoshi Yamada, c/o Hitachi Shimizu Engineering Co., Ltd., Shizuoka, 424-0926; Kensaku Oguni; Satoru Yoshida, both of c/o Shimizu Works, Hitachi Air Conditioning Systems Co., Ltd., 23-2, Kandasudacho 1-chome, Chiyoda-ku, Tokyo 101-0041, all of (JP)

( * ) Notice: Subject to any disclaimer, the term of this patent is extended or adjusted under 35 U.S.C. 154(b) by 0 days.

(21) Appl. No.: 09/699,473

(22) Filed: Oct. 31, 2000

(51) Int. Cl.[7] ................................................. F25B 13/00
(52) U.S. Cl. ........................................ 62/324.6; 62/160
(58) Field of Search ............................ 62/324.1, 324.6, 62/160, 228.4, 228.5

(56) References Cited

U.S. PATENT DOCUMENTS

| | | | | |
|---|---|---|---|---|
| 4,487,031 A | * | 12/1984 | Rogers et al. | 62/160 |
| 4,628,700 A | * | 12/1986 | Alsenz | 62/152 |
| 5,029,449 A | * | 7/1991 | Wilkinson | 62/175 |
| 5,370,307 A | * | 12/1994 | Uehra | 237/2 B |
| 5,970,728 A | * | 10/1999 | Hebert | 62/160 |
| 6,102,114 A | * | 8/2000 | Nishihara et al. | 165/207 |

* cited by examiner

Primary Examiner—William Doerrler
(74) Attorney, Agent, or Firm—Antonelli, Terry, Stout & Kraus, LLP

(57) ABSTRACT

A heat pump type air conditioner comprising: an exterior unit including an exterior heat exchanger, a plurality of compressors, a four-way valve, an exterior expansion device, and an injection circuit for injecting the liquid refrigerant into each of the plurality of compressors; and a plurality of interior units, each of which includes an interior heat exchanger, connected to the exterior unit. The exterior unit further comprises device for controlling flow rate of the liquid refrigerant to be injected in accordance with number of the plurality of interior units.

8 Claims, 3 Drawing Sheets i CAPACITY CONTROL TYPE COMPRESSOR ii CONSTANT SPEED TYPE COMPRESSOR A iii CONSTANT SPEED TYPE COMPRESSOR B

HEAT PUMP TYPE CONDITIONER AND EXTERIOR UNIT

BACKGROUND OF THE INVENTION

The present invention relates to a multiple type, heat pump type air conditioner in which a plurality of interior units are operated simultaneously or individually by utilizing a vapor compression refrigerating cycle. More particularly, it is suitable for a heat pump type air conditioner used in a cold district where the exterior air temperature decreases, for example, below −15° C. in winter.

A technique in which a high-pressure liquid refrigerant is injected into a compression mechanism of a compressor (liquid injection) and the flow rate thereof is controlled to deliver a high heating capability even in a cold district has been known, and is described in JP-A-8-210709 specification, for example.

Also, a technique in which when a plurality of compressors are provided in parallel, liquid injections with flow rate control are respectively provided in order not to stop all compressors at the time of maintenance is described in JP-A-7-151396 specification.

Further, a technique in which a supercooler is integrally provided with an exterior heat exchanger at a lower part thereof to prevent the lower part of the exterior heat exchanger from being frosted and to further increase the heating capability and the coefficient of performance is described in JP-A-9-229496 specification, for example.

In the technique described in JP-A-8-210709 specification, which is a prior art, since only one capacity control type compressor is used, the size of the compressor must be made larger to increase the capacity, so that this technique is unfavorable in view of standardization of production facility or the like. Also, in order to decrease a minimum capability for energy saving, that is, to increase a difference between the maximum and minimum capabilities, it is necessary to further decrease the minimum rotational speed of the compressor. If the minimum rotational speed is decreased, it becomes difficult to form oil film on bearings, so that improvement in the bearings and an oil feeding mechanism is further required.

BRIEF SUMMARY OF THE INVENTION

An object of the present invention is to solve the problems with the prior art, and to provide a highly reliable heat pump type air conditioner in which a difference between the maximum and minimum capabilities is increased without increasing the size of a compressor.

Also, another object of the present invention is to enable the standardization of compressor and facilitate the expansion of product range regardless of the capability required for an air conditioner.

Further, still another object of the present invention is to enable substantial heating operation even if the exterior air temperature is below −15° C. by obtaining a high heating capability.

Further, still another object of the present invention is to prevent frosting and icing at the lower part of an exterior heat exchanger even if the heat exchange amount in the exterior heat exchanger increases at the time of heating operation, and to thereby increase the heating capability.

The present invention solves at least one of the above-described problems and achieves at least one of the above-described objects.

To attain the above objects, the present invention provides a heat pump type air conditioner comprising: an exterior unit including an exterior heat exchanger, a plurality of compressors, a four-way valve, an exterior expansion device, and an injection circuit for injecting the liquid refrigerant into each of said plurality of compressors; and a plurality of interior units, each of which includes an interior heat exchanger, connected to said exterior unit, wherein said exterior unit further comprises means for controlling flow rate of the liquid refrigerant to be injected in accordance with number of said plurality of interior units.

With this structure, amounts of liquid injection into the compressors are respectively controlled in accordance with the number of interior units. Therefore, even if the necessary capacity increases and the compressors are operated at a high compression ratio, the compressors are cooled accordingly. As a result, the temperature in the compressors does not increase abnormally, thereby achieving a high efficiency. Further, the minimum rotational speed need not be decreased for one compressor even if a difference between the maximum and minimum capabilities is increased. Therefore, the size of compressor need not be increased, and the formation of oil film on bearings can be made easy, so that the reliability can be enhanced.

Also, the present invention provides a heat pump type air conditioner comprising: an exterior unit including an exterior heat exchanger, a plurality of compressors including a capacity variable type compressor of which rotational speed is controlled, a four-way valve, an exterior expansion valve, and an injection circuit for injecting the liquid refrigerant into each of said plurality of compressors; and a plurality of interior units, each of which includes an interior heat exchanger, connected to said exterior unit, wherein said air conditioner further comprises: a liquid injection expansion valve provided in said injection circuit; and a flow rate controlling means for controlling degree of opening of said liquid injection expansion valve.

In this air conditioner, a plurality of compressors are provided, the liquid refrigerant is injected into each of the compressors, and at least one compressor comprises a capacity variable type compressor of which rotational speed is controlled. Therefore, even if high pressure ratio operation is performed at the maximum capacity, the compressor is cooled accordingly. At the minimum capacity, the capacity can be controlled so as to be the minimum. Therefore, the difference between the maximum and minimum capabilities can be increased further.

Further, in the above-described heat pump type air conditioner, it is preferable that the capacity variable type compressor comprises a scroll compressor in which liquid injection is effected at an intermediate portion between a suction portion and a discharge portion of said compressor.

Further, it is preferable that the injection circuit comprises circuit portions respectively provided for said plurality of compressors, and said flow rate controlling means comprises devices respectively provided in said injection circuit portions.

Further, preferably, a supercool heat exchanger is provided at the lower part of the exterior heat exchanger.

Further, preferably, the plurality of compressors include a scroll type compressor, and the air conditioner further comprises: a liquid injection expansion valve provided in the injection circuit; a flow rate controller for controlling degree of opening of the liquid injection expansion valve; and a controller which, when an exterior air temperature is low, causes the interior heat exchanger to be operated as a condenser and controls said four-way valve so that an interior of a room is heated.

With this, since at least one of the compressors is made of a scroll type, which is suitable for low-speed rotation to high-speed rotation, and the interior of a room is heated even if the exterior air temperature is −15° C. or lower, a clean electric air conditioner which is easy to handle can be provided even in a district where the lowest exterior air temperature ranges from −15° C. to −20° C., for example, in Asahikawa in Hokkaido without the use of an energy source other than electricity such as kerosene and gas.

Further, the present invention provides an exterior unit comprising: an exterior heat exchanger; a plurality of compressors including a capacity variable type scroll compressor; a four-way valve; an exterior expansion valve; an injection circuit for injecting the liquid refrigerant into each of said plurality of compressors; a liquid injection expansion valve provided in said injection circuit; and a flow rate control means for controlling opening degree of said liquid injection expansion valve. The exterior unit is operated so that the capability from the minimum to the maximum is variable in a range of 10% to 130% of a rated capability.

At least one of the compressors is made of a scroll type, which is suitable for low-speed rotation to high-speed rotation, the liquid refrigerant is injected into each of the compressors, and the operation is performed by varying the capability in the range of 10% to 130% of a rated capability. Therefore, the compressor can be standardized without increasing the size of the compressor regardless of the necessary capability.

Further, the above-described exterior unit preferably comprises an injection circuit for injecting the liquid refrigerant into each of the compressors; a liquid injection expansion valve provided in the injection circuit; and a flow rate controller for controlling the degree of opening of the liquid injection expansion valve.

Further, in the above-described heat pump type air conditioner, it is preferable that the plurality of compressors include a capacity variable type compressor of which rotational speed is controlled, and that the air conditioner further comprises, a liquid injection expansion valve provided in an injection circuit portion of the injection circuit for the capacity variable compressor, liquid injection electromagnetic valves respectively provided in injection circuit portions of the injection circuit for compressors other than the capacity variable compressor, and a flow rate controller for controlling degree of opening of the liquid injection expansion valve and opening/closing of the electromagnetic valves.

DETAILED DESCRIPTION OF PREFERRED EMBODIMENTS

Figure 1:
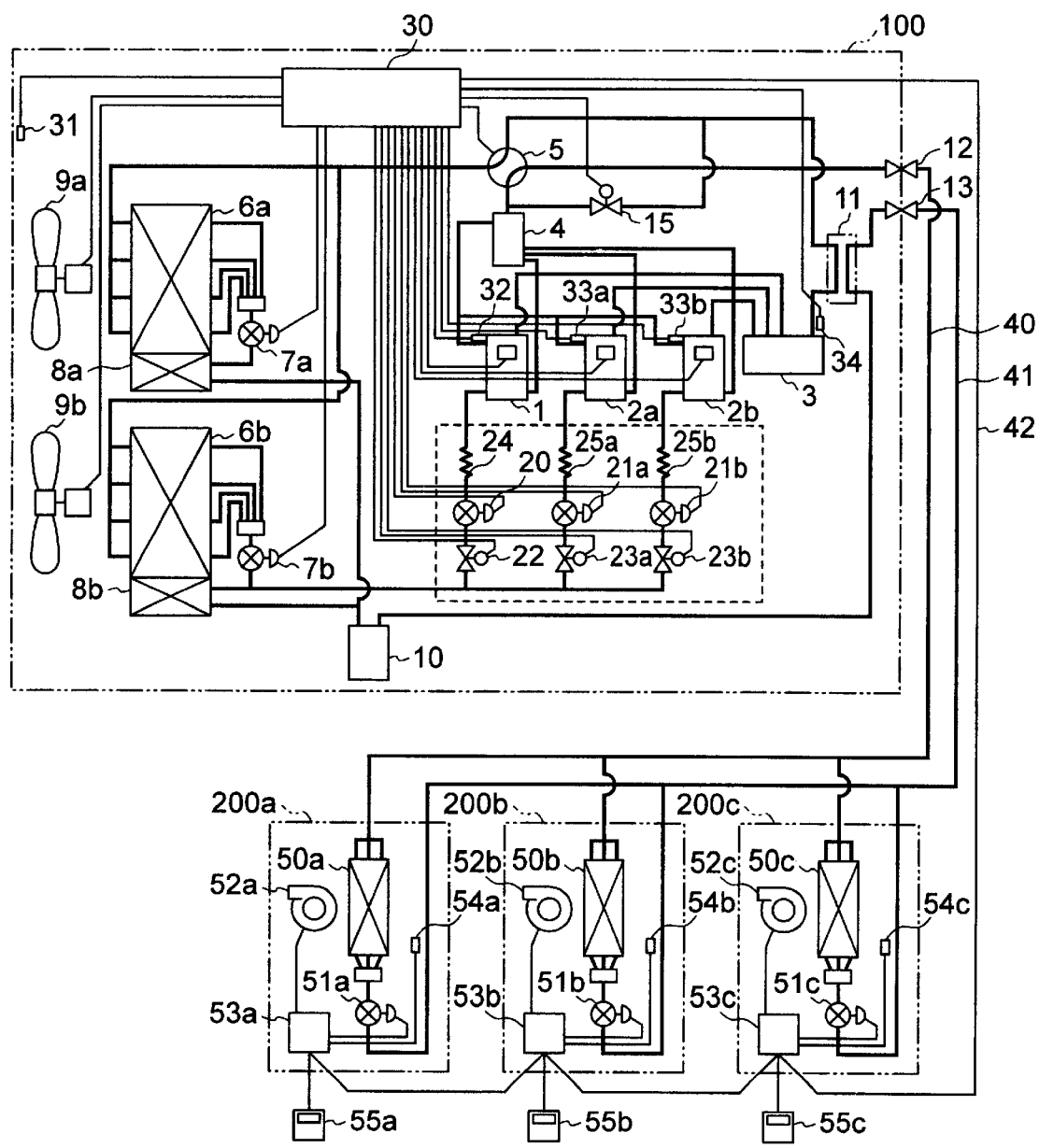
FIG. 1 is a block diagram showing a refrigeration cycle configuration in a first embodiment of the present invention.

An embodiment will now be described with reference to the accompanying drawings. FIG. 1 is a configuration view of a refrigeration cycle showing a first embodiment. Reference numeral 1 denotes a capacity control type compressor, 2a and 2b denote constant speed type compressors, 3 denotes an accumulator, 4 denotes an oil separator, 5 denotes a four-way valve, 6a and 6b denote exterior heat exchangers, 7a and 7b denote exterior expansion valves, 8a and 8b denote supercoolers, 9a and 9b denote exterior blowers, 10 denotes a receiver, 11 denotes a gas-liquid heat exchanger, 12 denotes a gas stopping valve, 13 denotes a liquid stopping valve, 15 denotes a gas bypath, 20 denotes a liquid injection expansion valve for capacity control type compressor, 21a and 21b denote liquid injection expansion valves for constant speed type compressor, 22 denotes a liquid injection electromagnetic valve for capacity control type compressor, 23a and 23b denote liquid injection electromagnetic valves for constant speed type compressor, 24 denotes an liquid injection capillary tube for capacity control type compressor, 25a and 25b denote liquid injection capillary tubes for constant speed type compressor, 30 denotes an exterior controller, 31 denotes an exterior temperature sensor, 32 denotes a discharge temperature sensor for capacity control type compressor, 33a and 33b denote discharge temperature sensors for constant speed type compressor, and 34 denotes a suction temperature sensor. These elements constitute an exterior unit 100.

Also, reference numerals 50a, 50b and 50c denote interior heat exchangers, 51a, 51b and 51c denote interior expansion valves, 52a, 52b and 52c denote interior blowers, 53a, 53b and 53c denote interior controllers, 54a, 54b and 54c denote interior suction temperature sensors, and 55a, 55b and 55c denote remote controllers. These elements constitute interior units 200a, 200b and 200c, respectively.

Further, the interior units 200a, 200b and 200c are connected to the exterior unit 100 via a gas connection pipe 40 and a liquid connection pipe 41, and the interior controllers 53a, 53b and 53c are connected to the exterior controller 30 via a transmission line 42. The remote controllers 55a, 55b and 55c are operated to perform operation for effecting air conditioning.

With increasing needs for manpower saving in installing the exterior unit, space saving, and individual distributed air conditioning, a multiple type air conditioner, in which a plurality of interior units are connected to one capacity-controllable exterior unit so that each of the interior units can be operated or stopped individually, has been widely used. Further, in recent years, from the viewpoint of a decrease in installation cost due to manpower saving and space saving, the capacity of the exterior unit has increased steadily. To make many interior units capable of being connected and moreover to make individual operation capable of being performed, in the multiple type air conditioner having a relatively high capacity, it is general that a plurality of compressors are mounted to make the air conditioning capacity variable by the number of operated compressors.

On the other hand, in the high latitudes, there is a great need for an electric air conditioner, which provides enhanced safety and ease of handling of equipment, produces no exhaust gas, and uses clean energy as compared with heating equipment using kerosene or gas, and there is needed a higher-capacity, heat pump type air conditioner, which ensures sufficient heating capability and blowout temperature even at a temperature of below −15° C.

In this embodiment, all of the compressors adopt a liquid injection type, in which a supercooled liquid refrigerant is decompressed and injected into a compression chamber having an intermediate pressure between suction pressure and discharge pressure. Thereby, even when the suction pressure is low and the quantity of suction gas is small, the refrigerant due to liquid injection is added at a halfway position, so that the quantity of discharged refrigerant increases. That is to say, even if the evaporation temperature is low, the circulation amount of refrigerant of compressor can be increased. Further, in case of a scroll type compressor in which the intermediate pressure is introduced to the back face of orbiting scroll to produce a pressing force on a fixed scroll, even in the operation at a high pressure ratio as described above, the back pressure of orbiting scroll can be increased, and the quantity of leakage of refrigerant subjected to liquid injection to the low pressure side is small, thereby the reliability is ensured, so that the compressor of this type can be used for heating operation in the case where the outside temperature is far lower. Therefore, highly efficient operation can be performed.

The following is a description of the operation of this embodiment. When any or all of the remote controllers 55a, 55b and 55c are switched on, the compressors, blowers, electromagnetic valves, and expansion valves are operated by the interior controllers 53a, 53b and 53c and the exterior controller 30.

Figure 4:
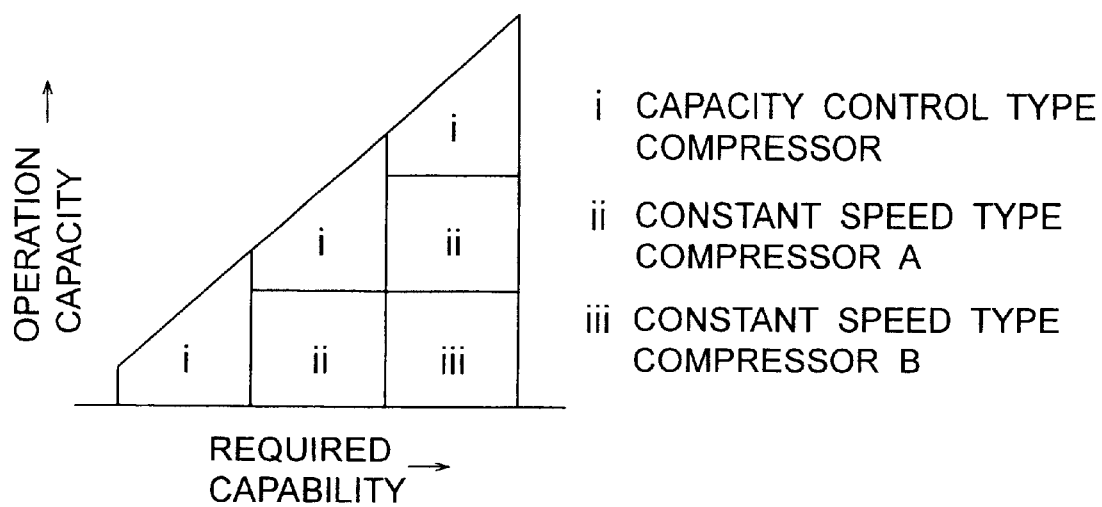
FIG. 4 is a pattern chart showing an operation status of a compressor in the first embodiment of the present invention.

The control of the number of compressors to be operated will be described with reference to FIG. 4. FIG. 4 shows a case where one capacity control type compressor and two constant speed type compressors are combined as in this embodiment. First, when any or all of the remote controllers 55a, 55b and 55c are switched on, the necessary operation capacity for the compressor switched-on is calculated on the basis of the required capability determined from the capacity of the interior unit or units switched-on, the relationship between the preset temperature and the interior suction temperature, and the like. For example, in case of (i) in which the number of interior units to be operated is small or the air conditioning load is low and thus the necessary operation capacity is low, only the capacity control type compressor 1 is operated, and for example, if the compressor 1 uses rotational speed control performed by an inverter, the rotational speed the compressor 1 is changed to accommodate a change in the necessary operation capacity. When the necessary operation capacity exceeds the maximum capacity of the capacity control type compressor 1, the capacity control type compressor 1 and one of the constant speed type compressors 2a and 2b are operated at the same time as shown by (i) and (ii), by which operation is performed by the total capacity of two compressors. Further, when all of the interior units are operated or when a high air conditioning capability is needed, all of the compressors are operated, by which operation is performed by the total capacity of (i), (ii) and (iii).

Figure 5:
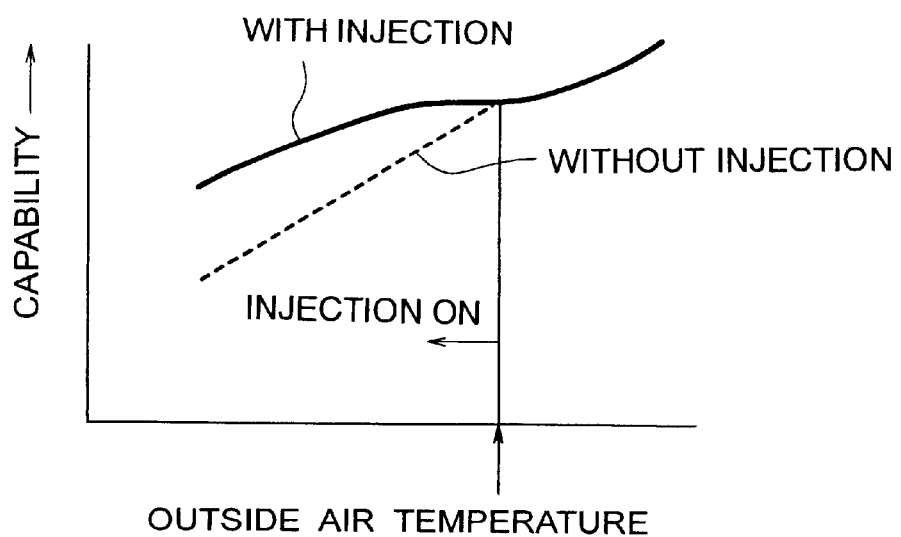
FIG. 5 is a diagram showing the operation and effect of liquid injection in the first embodiment of the present invention.

The operation of a liquid injection circuit at the time of heating operation at a low outside air temperature will be described hereinafter. First, the condition in which the liquid injection operates is shown in FIG. 5. When the outside air temperature detected by the exterior temperature sensor 31 is below a predetermined temperature T°C. and the pressure on the low pressure side is decreased by a decrease in evaporation temperature, and thereby the compressor or compressors is operated at a high pressure ratio, the operation of liquid injection circuit is started. First, the degrees of opening of the exterior expansion valves 7a and 7b are controlled so that the suction side of the compressor or compressors becomes superheat on the basis of the temperature detected by the suction temperature sensor 34. The liquid injection electromagnetic valve 22 for the capacity control type compressor 1 and the liquid injection electromagnetic valve or valves 23a, 23b for the constant speed type compressor or compressors in operation are opened, and the liquid injection expansion valve 20 and the liquid injection expansion valve or valves 21a, 21b for the constant speed type compressor or compressors in operation are opened gradually, whereby a liquid refrigerant having passed through the supercooler 8b is introduced into the compressor or compressors in operation.

The liquid injection amounts are individually controlled so that the discharge temperature of each of the compressors detected by the discharge temperature sensor 32 for the capacity control type compressor 1 and the discharge temperature sensors 33a, 33b for the constant speed type compressors 2a, 2b has a predetermined value. Since the liquid injection expansion valve and electromagnetic valve for the constant speed type compressor not in operation are closed, the inflow of liquid refrigerant into the compression chamber is prevented. Also, the liquid refrigerant in the liquid injection circuit is injected into the compression chambers of the compressors in operation through the liquid injection capillary tube 24 for capacity control type compressor 1 and the liquid injection capillary tube or tubes 25a, 25b for the constant speed type compressors 2a, 2b. Therefore, the propagation of pressure pulsation in the compression chambers to the expansion valves or electromagnetic valves is restrained by the pressure losses in the capillary tubes, so that the expansion valves and electromagnetic valves are prevented from being failed by the pressure pulsation.

As described above, since the liquid injection amounts with respect to the plurality of compressors can be controlled individually, the liquid injection amounts can be regulated to optimum values independent of a difference in circulation amount of refrigerant due to the operation capacity of the capacity control type compressor and the discharge amounts of the compressors or a difference in motor efficiency and compression efficiency due to the individual difference among the compressors etc. Also, since the liquid injection can be closed for the compressor not in operation, compressor failures caused by the charging of refrigerant liquid into the compressor chamber can be prevented. Therefore, the individual start and stop of the compressors can be effected, and a large difference between the maximum and minimum capacities can be obtained. Also, a large-sized air conditioner can be operated through a combination of a plurality of small compressors, and an expansion of power of products can be facilitated by the common use of the constant speed type compressors.

Also, even when the outside air temperature is low, leading to high pressure ratio operation, a proper injection amounts can be obtained independent of the number of the compressors in operation. Therefore, the quantity of refrigerant sucked into the compressor or compressors increases and the circulation amount of refrigerant increases, and also the compressor or compressors is cooled by the latent heat of vaporization of the liquid refrigerant due to the liquid injection. Thereby, heat by the heat radiation of the compressor or compressors is recovered, and also the efficiency of the compressor or compressors is improved, so that a high heating capability can be achieved, and a highly efficient operation can be performed.

Figure 2:
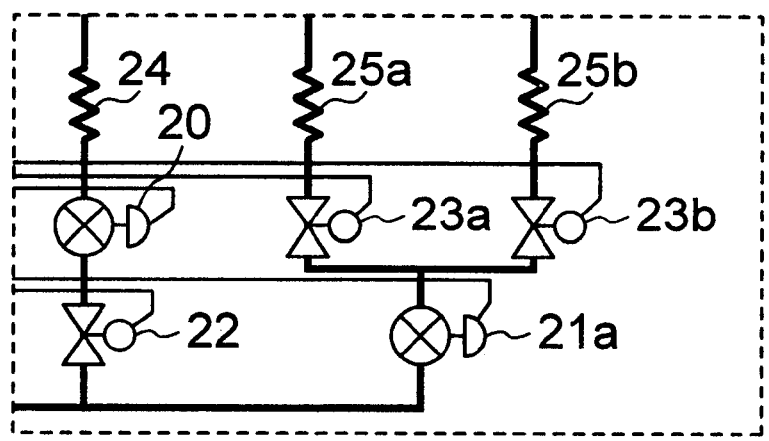
FIG. 2 is a block diagram showing a part of a refrigeration cycle configuration in a second embodiment of the present invention.

Next, a second embodiment of the present invention will be described. FIG. 2 shows the second embodiment of the present invention, which drawing shows only a portion of the liquid injection circuit enclosed by a broken line in FIG. 1. In this embodiment, the liquid injection for the constant speed type compressor or compressors 2a, 2b branches off after the flow rate is controlled by the liquid injection expansion valve 21a so that the liquid refrigerant is supplied to each compressor through the liquid injection electromagnetic valve or valves 23a, 23b and the liquid injection capillary tube or tubes 25a, 25b. If only one of the constant speed type compressors is operated, the electromagnetic valve for the compressor not in operation is closed to prevent injection. By configuring the liquid injection circuit in this manner, the number of expansion valves for liquid injection, which are expensive and liable to cause failures, can be decreased, so that the number of parts including an electrical circuit for driving can be decreased, whereby the reliability is enhanced.

Figure 3:
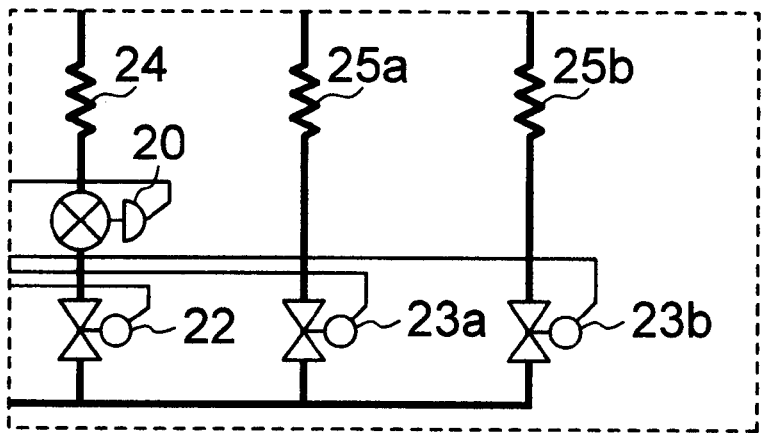
FIG. 3 is a block diagram showing a part of a refrigeration cycle configuration in a third embodiment of the present invention.

Next, a third embodiment of the present invention will be described. FIG. 3 shows the third embodiment of the present invention, which drawing shows only a portion of the liquid injection circuit enclosed by the broken line in FIG. 1. In this embodiment, the liquid injection for the constant speed type compressor or compressors 2a, 2b is configured so that the liquid refrigerant is supplied to each compressor through the liquid injection electromagnetic valve or valves 23a, 23b and the liquid injection capillary tube or tubes 25a, 25b. The flow rate of the liquid injection the compressor or compressors is fixed by only the decompression amount of the capillary tube or tubes. The specification of the capillary tube is such that a liquid injection amount capable of obtaining desirable performance under a certain operation condition in accordance with the discharge amount of the constant speed type compressor can be obtained.

In this embodiment, for the liquid injection circuit on the side of the constant speed type compressors, when the discharge temperature is reached a certain temperature after the compressor or compressors is started, the liquid injection electromagnetic valves 23a, 23b for the constant speed type compressors are opened, by which injection is started. At this time, if the discharge temperature is decreased excessively due to the operation condition, the exterior expansion valves 7a and 7b are regulated (controlled) so that the discharge temperature becomes a predetermined value, by which the degree of superheat on suction side of the compressors is increased to raise the discharge temperature.

Also, inversely when the discharge temperature continues to rise despite the fact that the electromagnetic valve or valves is opened, the exterior expansion valves 7a and 7b are regulated to decrease the degree of superheat on the compressor suction side, by which the discharge temperature is decreased. By operating (controlling) the exterior expansion valves considering not only the degree of suction superheat but also the discharge temperature in this manner, even if the flow rate of the liquid injection is fixed by the capillary tubes, the discharge temperature of the compressors is not increased or decreased excessively, which prevents the operation that decreases the reliability of the compressors, such as the operation in which the heat resistant temperature of the motor is exceeded or the decrease in viscosity of refrigerator oil.

Thus, the liquid injection expansion valve for constant speed type compressor can be eliminated, so that the number of parts is decreased further, by which the reliability can be enhanced further.

Also, when a motor-operated expansion valve is used for the flow rate control of the liquid injection circuit, the motor-operated expansion valve and a driving electrical circuit are needed. From the viewpoint of restraining the increase in the number of parts and the increase in the number of locations liable to cause failures, it is preferable to use a method that is realized by a construction as simple as possible.

For a high-capacity air conditioner, because of increased heat exchange amount in the exterior heat exchanger, at the time of defrosting operation, in which frost on the exterior heat exchanger, which serves as an evaporator at the time of heating operation, is removed, a large amount of water is produced by deicing drops, which water turns to a lump of ice at the lower part of the exterior heat exchanger, which increases the defrosting time, thereby decreasing the heating capability. Therefore, the installation of the supercooler at the lower part of the exterior heat exchanger for preventing frosting and icing is more effective in improving the heating capability.

In the above embodiments, an example in which two systems of exterior heat exchanger, supercooler, and exterior expansion valve are provided has been described, but the air conditioner can be operated similarly even in case of one system or three or more systems. Also, for the compressor, a case where one continuous capacity control type compressor, for example, that is controlled by an inverter is used has been described. However, the operation of compressor having the control of the number of constant speed type compressors to be operated and the stepwise capacity control using an unloader function using a bypath etc. or a pole change motor may be combined.

According to the above-described embodiments, even if a plurality of compressors are used for the air conditioner, as the liquid injection amounts can be controlled individually, the liquid injection amounts can be regulated so as to be the optimum amounts independent of the operation capacity of the capacity control type compressor and the difference in motor efficiency and compression efficiency due to the difference among the compressors. Also, since the liquid injection can be closed for the compressor or compressors not in operation, compressor failures caused by the charging of refrigerant liquid into the compressor chamber can be prevented. Therefore, the individual start and stop of the compressors can be effected, and a large difference between the maximum and minimum capacities can be obtained. Also, a large-sized air conditioner can be operated through a combination of a plurality of small compressors, and an expansion of power of products can be facilitated by the common use of constant speed type compressor.

Further, even when the outside air temperature is low, leading to high pressure ratio operation, a proper injection amount can be obtained independent of the number of operated compressors. Therefore, the quantity of refrigerant sucked into the compressors increases and the circulation amount of refrigerant increases, and also the compressors are cooled by the latent heat of vaporization of liquid refrigerant due to liquid injection. Thereby, heat by the heat radiation of the compressors is recovered, and also the efficiency of the compressors is improved, so that a high heating capability can be achieved, and a highly efficient operation can be performed.

Further, the number of expansion valves for liquid injection, which are expensive and liable to cause failures, can be decreased, so that an air conditioner with high reliability and high production efficiency can be obtained.

As described above, according to the invention, in the multiple type, heat pump type air conditioner, in which a plurality of interior units are operated simultaneously or individually, a difference between the maximum and minimum capabilities is increased without increasing the size of the compressor, so that the reliability can be enhanced.

What is claimed is:

1. A heat pump type air conditioner comprising:

an exterior unit including an exterior heat exchanger, a plurality of compressors, a four-way valve, an exterior expansion device, and an injection circuit for injecting the liquid refrigerant into each of said plurality of compressors, wherein said plurality of compressors includes a capacity variable type compressor of which rotational speed is controlled;

a plurality of interior units, each of which includes an interior heat exchanger, connected to said exterior unit, wherein said exterior unit further comprises means for controlling flow rate of the liquid refrigerant to be injected in accordance with number of said plurality of interior units;

a liquid injection expansion valve provided in an injection circuit portion of said injection circuit for said capacity variable compressor, liquid injection electromagnetic valves respectively provided in injection circuit portions of said injection circuit or compressors other than said capacity variable compressor, and a flow rate controller for controlling degree of opening of said liquid injection expansion valve and opening/closing of said electromagnetic valves.

2. The heat pump type air conditioner according to claim 1, wherein a supercool heat exchanger is provided at a lower part of said exterior heat exchanger.

3. The heat pump type air conditioner according to claim 1, wherein said plurality of compressors includes a scroll type compressor, and said air conditioner further comprises:

a controller which, when an exterior air temperature is low, causes said interior heat exchanger to be operated as a condenser and controls said four-way valve so that an interior of a room is heated.

4. The heat pump type air conditioner according to claim 1, wherein said injection circuit includes a capillary tube.

5. A heat pump type air conditioner comprising:

an exterior unit including an exterior heat exchanger, a plurality of compressors including a capacity variable type compressor of which rotational speed is controlled, a fourway valve, an exterior expansion valve, and an injection circuit for injecting the liquid refrigerant into each of said plurality of compressors; and a plurality of interior units, each of which includes an interior heat exchanger, connected to said exterior unit;

a liquid injection expansion valve provided in said injection circuit; and a flow rate controlling means for controlling degree of opening of said liquid injection expansion valve, wherein said injection circuit portions provided for the compressors other than said capacity variable compressor respectively include liquid injection electromagnetic valves, and said injection circuit portions including said liquid injection electromagnetic valves are grouped, and a liquid injection expansion valve is provided in said grouped circuits.

6. The heat pump type air conditioner according to claim 5, wherein said capacity variable type compressor comprises a scroll compressor in which liquid injection is effected at an intermediate portion between a suction portion and a discharge portion of said compressor.

7. The heat pump type air conditioner according to claim 5, wherein a supercool heat exchanger is provided at a lower part of said exterior heat exchanger.

8. The heat pump type air conditioner according to claim 5, wherein said plurality of compressors includes a scroll compressor.

* * * * *